United States Patent

[11] 3,590,628

| [72] | Inventor | Harold W. Orr<br>Borger, Tex. |
|---|---|---|
| [21] | Appl. No. | 793,420 |
| [22] | Filed | Jan. 23, 1969 |
| [45] | Patented | July 6, 1971 |
| [73] | Assignee | Phillips Petroleum Company |

[54] BASELINE COMPENSATION FOR CHROMATOGRAPHIC ANALYZER
1 Claim, 3 Drawing Figs.

[52] U.S. Cl. .................................................. 73/23.1,
23/254, 179/100.2
[51] Int. Cl. ........................................... G01n31/08,
G11b 5/00
[50] Field of Search ........................................ 73/23.1,
25—27; 179/100.2

[56] References Cited
UNITED STATES PATENTS

| 3,094,862 | 6/1963 | Burk .............................. | 73/23.1 |
| 3,257,847 | 6/1966 | Levy .............................. | 73/23.1 |
| 3,329,005 | 7/1967 | Levy .............................. | 73/23.1 |
| 3,381,519 | 5/1968 | Ashmead ...................... | 73/23.1 |

Primary Examiner—Richard C. Queisser
Assistant Examiner—C. E. Snee, III
Attorney—Young and Quigg

ABSTRACT: A procedure is disclosed for compensating a chromatographic analyzer for baseline drift and irregularities. The analyzer is first operated under normal operating conditions except that a sample is not introduced. The output signal of the detector is recorded. This recorded signal is subsequently subtracted from the output signal during an actual analysis so that baseline drift and irregularities are eliminated.

BASELINE COMPENSATION FOR CHROMATOGRAPHIC ANALYZER

In order to obtain an accurate analysis of a sample material by chromatography, it is often necessary to provide some type of correction for baseline drift and other irregularities. Although efforts are usually made to operate the analyzer under controlled conditions, it is often impossible to eliminate all irregularities. For example, a certain amount of bleeding of the column packing material may occur if the temperature of the column is increased during operation to speed the analysis. It has also been found that fluctuations in the detector output may occur when the sample valve is switched.

Heretofore, various types of compensating circuits have been proposed to eliminate drift of the baseline of the analyzer output signal. Most of these devices have utilized some type of programmed signal generator to establish a compensation signal which approximates the base line drift, which signal is subtracted from the analyzer output. At best, these devices merely approximate the desired correction and are generally quite complex in construction. They also lack flexibility in the event that operating conditions change. While these circuits may be reasonably satisfactory in compensating for long term drift, they are not capable of compensating for other fluctuations in the baseline.

In accordance with this invention, a novel method is provided for compensating a chromatographic analyzer for both long term and short term fluctuations in the baseline of the detector output. This is accomplished by operating the column initially under normal operating conditions except that a sample is not introduced. The output signal of the detector is recorded. The column is then operated under the same conditions to perform the actual analysis. At this time, the original recorded signal is subtracted from the detector output so that any fluctuations in the baseline are eliminated. As long as the column is operated under conditions corresponding to those in existence at the time the initial signal is recorded, all fluctuations in the baseline are effectively eliminated.

Accordingly, it is an object of this invention to provide a novel method of compensating the output signal from a chromatographic analyzer for fluctuations in the baseline.

Another object is to provide improved detecting means for use with chromatographic analyzers.

Figure 1:
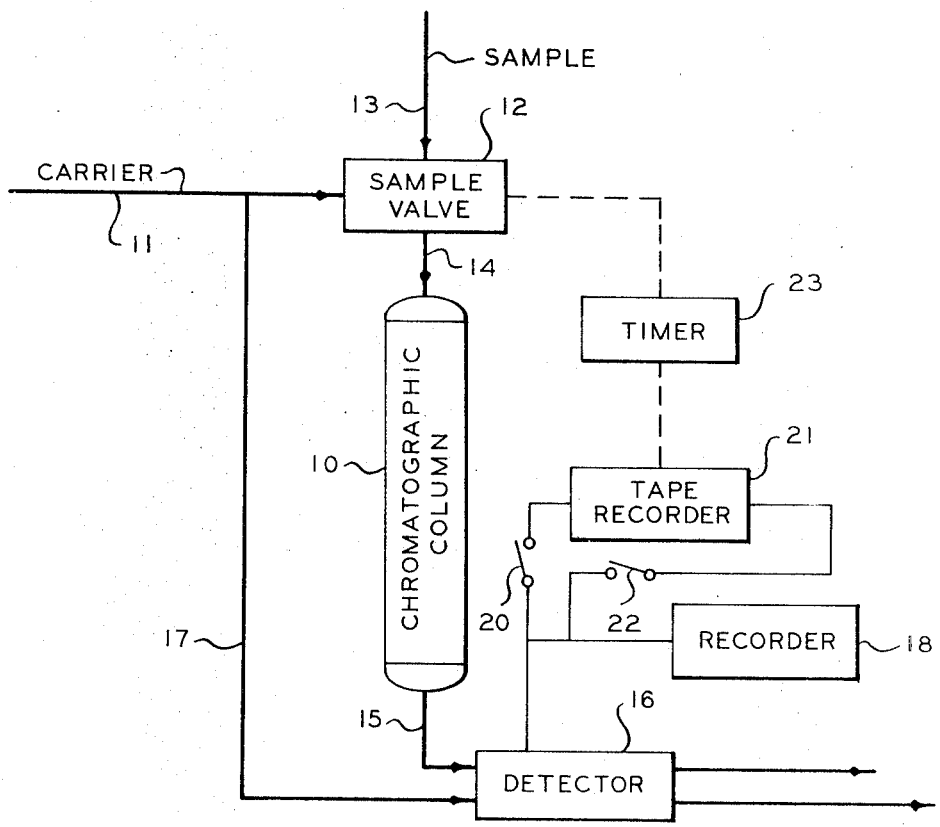
FIG. 1 is a schematic representation of a chromatographic analyzer having the compensating apparatus of this invention incorporated therein.

Referring now to the drawing in detail and to FIG. 1 in particular, there is shown a chromatographic column 10. A carrier fluid is introduced through a conduit 11 which communicates with the inlet of a sample valve 12. A sample of material to be analyzed is supplied to valve 12 through a conduit 13. The outlet of valve 12 is connected to the inlet of column 10 by a conduit 14. The effluent from column 10 is directed through a conduit 15 to the first channel of a detector 16. A conduit 17 communicates between conduit 11 and the inlet of a second channel of detector 16 to provide a reference fluid to the detector. The output signal from detector 16 is applied to a recorder 18.

The apparatus thus far described constitutes a conventional chromatographic analyzer. Carrier fluid initially is passed through valve 12 and column 10 to the first channel of detector 16, and carrier fluid alone is passed to the second channel of the detector. Valve 12 is then actuated to introduce a predetermined volume of sample to the column, after which time carrier fluid is again passed through the column to elute the sample constituents in sequence from the column. The appearance of these samples is detected by detector 16, and a signal representative of the differential composition of the fluids in conduits 15 and 17 is applied to recorder 18. As previously mentioned, it is difficult to design and operate an analyzer in which the baseline signal from detector 16 remains absolutely constant. This is particularly true if column 10 is elevated in temperature during analysis, as if often the case when it is desired to reduce the time to analyze a complex mixture. The resulting baseline signal from detector 16 often increases with time, as illustrated by curve 19 of FIG. 2. In addition to this long time drift, irregularities in the baseline curve often appear at the time the sample valve is switched. The actual differential output signal from detector 16 is of course superimposed on baseline curve 19 when an analysis is made. In order to simplify the interpretation of the detector output signal, it is desirable to eliminate baseline curve 19 completely so that the detector output remains at zero except when sample constituents appear in the column effluent.

Figure 2:
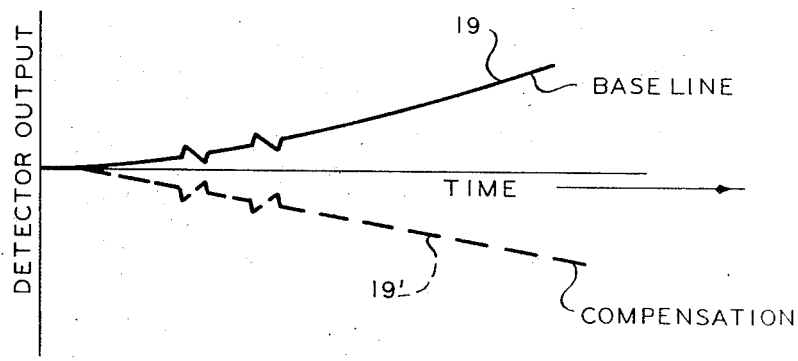
FIG. 2 is a graphical illustration of the baseline compensation feature of this invention.

In accordance with this invention, a compensation signal is established which corresponds to curve 19' in FIG. 2. Ideally, curve 19' is exactly the same shape as curve 19 so that the addition of the two signals results in a zero output signal. This is accomplished by means of the remaining apparatus illustrated in FIG. 1. The output signal from detector 16 is applied through a switch 20 to a tape recorder 21. The output signal from tape recorder 21 is applied through a switch 22 to recorder 18. The analyzer of FIG. 1 is operated initially under normal operating conditions except that a sample is not introduced into the system through conduit 13. Under these conditions, the output signal from detector 16 should remain at zero unless drift or other irregularities occur. Switch 20 is closed at this time so that the actual output signal from detector 16 is applied to tape recorder 21. If any irregularities occur in the detector output, such as shown by curve 19, these irregularities are recorded by recorder 21. Thereafter, the analyzer is operated under the same conditions and a sample is introduced through conduit 13. At this time, switch 20 is open and switch 22 is closed. Recorder 21 is operated so that the original recorded signal is applied to the input of recorder 18 in opposition to the output signal from detector 16. Thus, the original signal is subtracted from the detector output so that base line irregularities are eliminated. Sample valve 12 and tape recorder 21 are normally controlled by a timer 23 in the sequence to be described hereinafter in greater detail.

Figure 3:
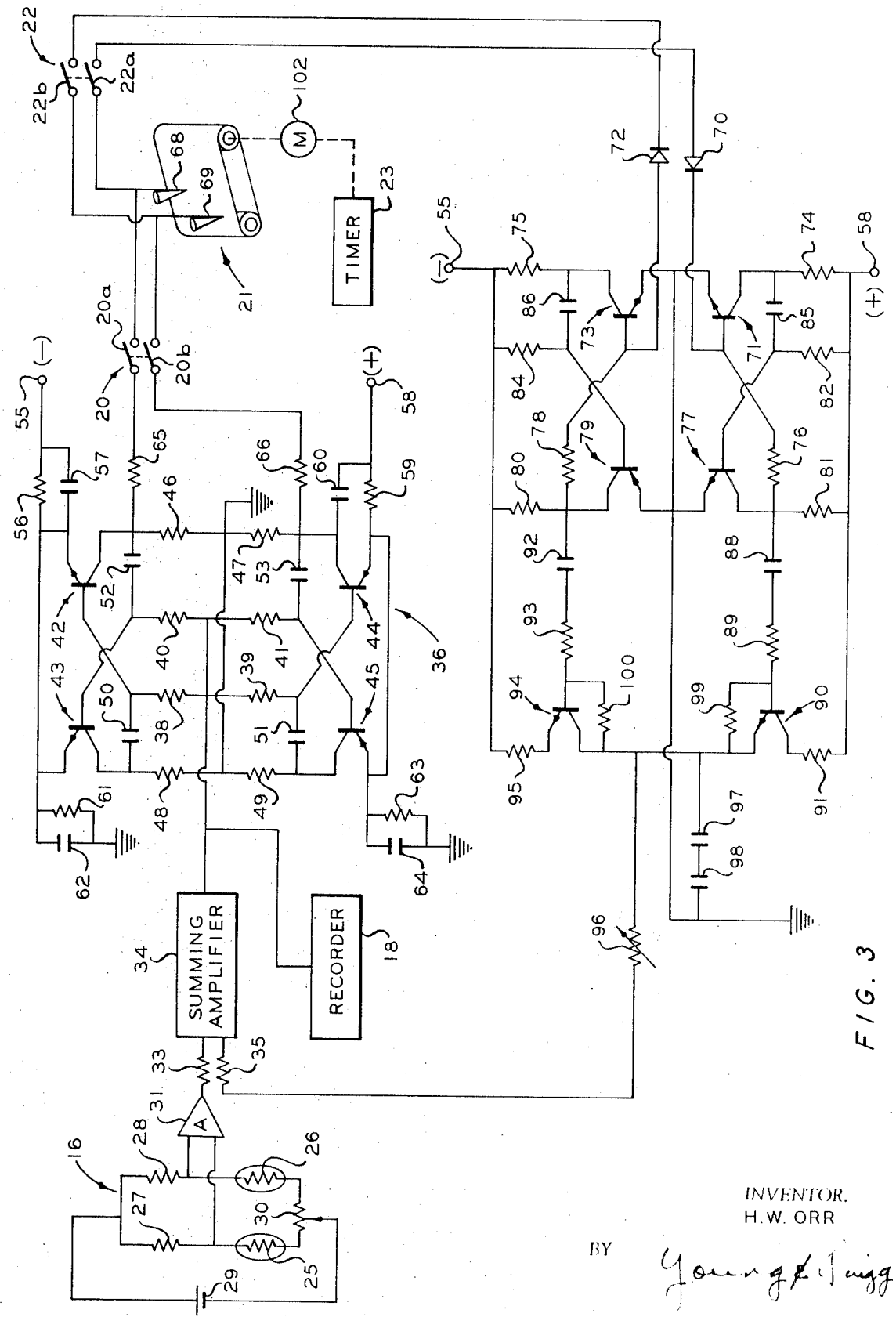
FIG. 3 is a schematic circuit drawing of an embodiment of the apparatus employed in the detector of FIG. 1.

A schematic circuit drawing of an embodiment of the compensating apparatus of FIG. 1 is illustrated in FIG. 3. Detector 16 can be provided with two temperature sensitive resistance elements 25 and 26 which are positioned in thermal contact with fluids flowing through respective conduits 15 and 17. Elements 25 and 26 form two arms of a bridge network, which is provided with additional resistance elements 27 and 28. The first terminal of a current source 29 is connected to the junction between resistors 27 and 28. The second terminal of current source 29 is connected to the contactor of a potentiometer 30. The end terminals of potentiometer 30 are connected to respective resistance elements 25 and 26. The junction between elements 26 and 28 is connected to the first input of a differential amplifier 31, and the junction between elements 25 and 27 is connected to the second input of amplifier 31. The circuit thus far described constitutes a conventional bridge detector for use with a chromatographic analyzer.

The output signal from amplifier 31 is applied through an input resistor 33 to the first input terminal of a conventional summing amplifier 34. A compensating signal from the network to be described is applied to the second input of summing amplifier 34 through an input resistor 35. This signal is effectively subtracted from the output signal from amplifier 31 so that a different signal is applied to recorder 18, as previously described in conjunction with FIG. 1.

It has been found that the use of frequency modulation recording apparatus is particularly effective in carrying out the compensation procedure of this invention. The output signal from amplifier 34 is applied to a frequency modulation network 36, the output of which is applied through switch 20 to tape recorder 21. Network 36 constitutes two complementary astable multivibrators. The output signal from amplifier 34 is applied to the junction between resistors 38 and 39 and to the junction between resistors 40 and 41. Resistor 38 is connected to the base of a NPN transistor 42, and resistor 40 is connected to the base of a similar transistor 43. Resistor 39 is connected to the base of a PNP transistor 44, and resistor 41 is connected to the base of a similar transistor 45. Resistors 46 and 47 are connected in series between the collectors of transistors 42 and 44, the junction between these resistors being connected to ground. Resistors 48 and 49 are connected in series between the collectors of transistors 43 and 44, the junction between these resistors being connected to ground. A capacitor 50 is connected between resistors 38 and 48, and a capacitor 51 is connected between resistors 39 and 49. A capacitor 52 is connected between resistors 40 and 46, and a capacitor 53 is connected between resistors 41 and 47. The emitter of transistor 42 is connected to a negative potential terminal 55 through a resistor 56 and a capacitor 57 which are connected in parallel. The emitter of transistor 44 is connected to a positive potential terminal 58 through a resistor 59 and a capacitor 60 which are connected in parallel. The emitter of transistor 42 is also connected to ground through a resistor 61 and a capacitor 62 which are connected in parallel. The emitter of transistor 43 is connected to the emitter of transistor 42. The emitter of transistor 44 is connected to ground through a resistor 63 and a capacitor 64 which are connected in parallel. The emitter of transistor 45 is connected to the emitter of transistor 44. The collector of transistor 42 is connected through an output resistor 65 to a switch 20a. Similarly, the collector of transistor 44 is connected through an output resistor 66 to a switch 20b. When these switches are closed, the output signals from network 36 are applied to respective recording heads 68 and 69 of tape recorder 21.

Network 36 serves to convert the baseline analog output signal from summing amplifier 34 into two signals which have substantially the same mean frequency. The two base frequencies established by the multivibrators of network 36 are varied in opposite directions by the analyzer output as complements of each other, and the output signals of the multivibrators are applied to separate channels of recorder 21. The use of two signals in this manner serves to compensate for any minor irregularities in the recording tape itself.

Head 68 of recorder 21 is connected through a switch 22a and a rectifier 70 to the base of a transistor 71. Head 69 is connected through a switch 22b and a rectifier 72 to the base of a transistor 73. Rectifiers 70 and 72 are of opposite polarity with respect to one another. The emitters of transistors 71 and 73 are connected to one another and to ground. The collector of transistor 71 is connected through a resistor 74 to positive potential terminal 58. The collector of transistor 73 is connected through a resistor 75 to a negative potential terminal 55. The base of transistor 71 is connected by a resistor 76 to the collector of a transistor 77. The base of transistor 73 is connected by a resistor 78 to the collector of a transistor 79. The emitters of transistors 77 and 79 are connected to one another and to ground. The collector of transistor 79 is connected through a resistor 80 to terminal 55, and the collector of transistor 77 is connected through a resistor 81 to terminal 58. The base of transistor 77 is connected by a resistor 82 to terminal 58, and the base of transistor 79 is connected by a resistor 84 to terminal 55. A capacitor 85 is connected between the collector of transistor 71 and the base of transistor 77. A capacitor 86 is connected between the collector of transistor 73 and the base of transistor 79.

Transistors 71, 73, 77 and 79 and the circuit elements associated therewith constitute two monostable multivibrators. The RC feedback networks of these monostable vibrators are of shorter duration than the highest frequency expected from the tape recorder. These monostable vibrators are complementary in the same manner as are the multivibrators of network 36. When switch 22 is closed and recorder 21 is actuated so that the previously recorded signals are reproduced, the resulting signals serve to trigger the multivibrators. These multivibrators serve to shape the tape output signals to provide square wave pulses having the same width.

The collector of transistor 77 is connected through a capacitor 88 and a resistor 89 to the base of a transistor 90. The collector of transistor 90 is connected by a resistor 91 to terminal 58. The collector of transistor 79 is connected by a capacitor 92 and a resistor 93 to the base of a transistor 94. The emitter of transistor 94 is connected by a resistor 95 to terminal 55. The collectors of transistors 90 and 94 are connected to one another and are connected by a variable resistor 96 to input resistor 35 of summing amplifier 34. Capacitors 97 and 98 are connected between the emitter of transistor 90 and ground. A resistor 99 is connected between the emitter and the base of transistor 90, and a resistor 100 is connected between the collector and the base of transistor 94.

Transistors 90 and 94 are driven by the square wave pulses established by the output multivibrators. In view of the fact that transistors 90 and 94 conduct when they receive pulses of opposite polarity and the average conductance of each is proportional to the frequencies of the square wave signals, a facsimile of the original analyzer output signal is produced. The circuit is connected such that the output signal applied through resistors 96 and 36 is subtracted from the output signal of amplifier 31. The net result is that the original recorded baseline signal is subtracted from the detector output so that a zero baseline signal is obtained.

Timer 23 is employed to control the operation of sample valve 12 and tape recorder 21 so that a plurality of analyses can be performed in sequence. In this manner, timer 23 starts tape drive motor 102 when sample valve 12 is actuated to introduce a sample into column 10.

While this invention has been described in conjunction with a presently preferred embodiment, it obviously is not limited thereto.

What I claim is:

1. In analysis apparatus including a chromatographic column, a sample valve, first conduit means communicating with said valve to introduce carrier fluid, second conduit means communicating with said valve to introduce sample material, third conduit means communicating between said valve and the inlet of said column, a detector adapted to establish a first analog output signal, fourth conduit means communicating between the outlet of said column and said detector, and a recorder connected to said detector; the improvement comprising:

a second recorder having first and second recording channels on a common recording medium;

first means selectively connecting the output of said detector to said second recorder, said first means including first and second frequency modulation networks having substantially the same mean frequency, means applying the output of said detector to said two networks so as to establish first and second signals of frequencies which deviate from said mean frequency by like amounts, the frequency of said first signal being above said mean frequency and the frequency of said second signal being below said mean frequency, and means applying said first and second signals to said first and second channels, respectively;

signal-subtracting means;

first and second frequency demodulation circuits;

means selectively connecting the first and second channels of said recorder to the respective inputs of said first and second circuits;

circuit means to combine the outputs of said first and second circuits to establish a second analog output signal corresponding to said first analog signal;

means applying said first and second analog signals to the respective inputs of said subtracting means; and means connecting the output of said subtracting means to said first-mentioned recorder.

UNITED STATES PATENT OFFICE

CERTIFICATE OF CORRECTION

Patent No. 3,590,628          Harold W. Orr          Dated July 6, 1971

It is certified that error appears in the above-identified patent and that said Letters Patent are hereby corrected as shown below:

Claim 1 should read as follows: 1. In analysis apparatus including a chromatographic column, a sample valve, first conduit means communicating with said valve to introduce carrier fluid, second conduit means communicating with said valve to introduce sample material, third conduit means communicating between said valve and the inlet of said column, a detector adapted to establish a first analog signal, fourth conduit means communicating between the outlet of said column and said detector, and a recorder connected to said detector; the improvement comprising:

a second recorder having first and second recording channels on a common recording medium;

first means for selectively connecting the output of said detector to said second recorder during a first operation of the analysis apparatus in the absence of sample material being passed to said column so as to record a base line compensation signal, said first means including first and second frequency modulation networks having substantially the same mean frequency, means applying the output of said detector to said two networks so as to establish first and second signals of frequencies which deviate from said mean frequency by like amounts, the frequency of said first signal being above said mean frequency and the frequency of said second signal being below said mean frequency, and means applying said first and second signals to said first and second channels, respectively;

signal subtracting means;

first and second frequency demodulation circuits;

means for selectively connecting the first and second channels of said second recorder to the respective inputs of said first and second circuits during a second operation of the analysis apparatus when sample material is passed to said column so that the previously recorded base line compensation signal is passed to said first and second circuits;

circuit means to combine the outputs of said first and second circuits during said second operation to establish a second analog output signal corresponding to said recorded base line compensation signal;

means for applying said first and second analog signals to the respective inputs of said subtracting means during said second operation so that said second analog signal is subtracted from said first analog signal; and means connecting the output of said subtracting means to said first-mentioned recorder.

Signed and sealed this 7th day of March 1972.

(SEAL)
Attest:

EDWARD M. FLETCHER, JR.          ROBERT GOTTSCHALK
Attesting Officer          Commissioner of Patents